United States Patent
Imaoka et al.

(10) Patent No.: US 6,174,060 B1
(45) Date of Patent: *Jan. 16, 2001

(54) PROJECTION-TYPE DISPLAY APPARATUS HAVING POLARIZED BEAM SPLITTERS AND AN ILLUMINATING DEVICE

(75) Inventors: Hirofumi Imaoka, Yokosuka; Satoru Moriya, Noda; Tetsuji Suzuki, Yokosuka; Fujiko Koyama, Yokohama; Ryusaku Takahashi, Yokosuka; Yasuo Ishizaka, Yokohama; Motomu Takada, Iwai, all of (JP)

(73) Assignee: Victor Company of Japan, Ltd., Yokohama (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/139,622

(22) Filed: Aug. 25, 1998

(30) Foreign Application Priority Data

Aug. 26, 1997 (JP) .................................................. 9-244584
Nov. 12, 1997 (JP) .................................................. 9-327135
Jan. 13, 1998 (JP) .................................................. 10-2079

(51) Int. Cl.⁷ .................................................. G03B 21/14
(52) U.S. Cl. ......................... 353/31; 353/20; 353/37; 349/9
(58) Field of Search .......................... 353/20, 8, 31, 353/33, 34, 37, 38; 349/9; 359/495, 496, 501

(56) References Cited

U.S. PATENT DOCUMENTS

| 4,191,456 | 3/1980 | Hong et al. .......................... 353/31 |
| 4,702,716 | * 10/1987 | Roberts .................................. 445/26 |
| 4,943,154 | * 7/1990 | Miyatake et al. .................... 353/34 |

(List continued on next page.)

FOREIGN PATENT DOCUMENTS

| 0 552 725A | 7/1993 | (EP) . |
| 0 646 828A | 4/1995 | (EP) . |
| 62-237485 | 10/1987 | (JP) . |
| 63-46490 | 2/1988 | (JP) . |
| 62-121821 | 5/1988 | (JP) . |
| 63-116123 | 5/1988 | (JP) . |
| 1-94985 | 6/1989 | (JP) . |
| 2-25016 | 1/1990 | (JP) . |
| 2-67312 | 5/1990 | (JP) . |
| 3-152526 | 6/1991 | (JP) . |
| 4-86725 | 3/1992 | (JP) . |
| 4-234016 | 8/1992 | (JP) . |
| 8-022035A | 5/1996 | (JP) . |
| 10-197949 | 7/1998 | (JP) . |
| 94/22042 | 9/1994 | (WO) . |

OTHER PUBLICATIONS

Kobayashi, S., "Display Technology Series Color Liquid Crystal Display" Dec. 14, 1990; pp. 111–113 Sanyo Tosho.

* cited by examiner

Primary Examiner—William Dowling
(74) Attorney, Agent, or Firm—Anderson, Kill & Olick P.C.

(57) ABSTRACT

A color separating/light guiding optics comprises two independent dichroic mirrors, reflection mirrors and correcting lenses. A horizontal plane region occupied by these optical components is entirely involved in a horizontal plane region occupied by a light modulating/color compositing/image projecting optics. A red beam is guided along a detoured optical path extending across a dead space below a projection lens. Although the optical path length of the red beam becomes longer than those of the blue beam and the green beam, the detoured optical path provides a sufficient space for installing the correcting lenses. The substantial optical path lengths of three primary color beams can be equalized with each other by the provision of these correcting lenses.

9 Claims, 10 Drawing Sheets

U.S. PATENT DOCUMENTS

| | | | |
|---|---|---|---|
| 5,365,287 | * 11/1994 | Vollmer et al. | 353/31 |
| 5,418,583 | * 5/1995 | Masumoto | 353/38 |
| 5,452,128 | * 9/1995 | Kimura | 353/33 |
| 5,626,409 | 5/1997 | Nakayama et al. | 353/31 |
| 5,653,520 | * 8/1997 | Kato | 353/34 |
| 5,719,702 | * 2/1998 | Decker | 359/487 |
| 5,786,934 | * 7/1998 | Chiu et al. | 353/33 |
| 5,798,819 | * 8/1998 | Hattori et al. | 353/33 |
| 5,808,795 | * 9/1998 | Shimomura et al. | 359/488 |

DIAGONAL LENGTH OF LIGHT PIPE (mm)

PROJECTION-TYPE DISPLAY APPARATUS HAVING POLARIZED BEAM SPLITTERS AND AN ILLUMINATING DEVICE

BACKGROUND OF THE INVENTION

The present invention relates to a projection-type display apparatus that is preferably applied to a triple-plate type color projector using reflection-type spatial light modulating sections, and more particularly to an improvement for preventing deterioration of a projected picture or image and eliminating adverse influence of unnecessary polarized component as well as providing an arrangement of optical elements for downsizing the apparatus.

The triple-plate type color projector has a light source, such as a xenon lamp or a metal halide lamp, to generate white light. The white light is separated into three primary color beams. Each separated color beam is guided to a corresponding spatial light modulating section, such as a liquid crystal panel, to modulate each color beam in accordance with an image signal relating to a corresponding color. Thereafter, three modulated beams are combined to project the resultant composite light on a screen.

The color separating and light guiding system of this display apparatus is generally arranged in such a manner that the optical path of each separated color beam extending from the light source to a corresponding spatial light modulating section is identical in length with those of two other separated color beams. This arrangement is essentially important for obtaining a highly bright projection image as well as eliminating undesirable color shading.

SUMMARY OF THE INVENTION

An object of the present invention is to provide an optical arrangement for downsizing the apparatus body of the triple-plate projection-type display apparatus that uses the reflection-type spatial light modulating sections.

Another object of the present invention is to provide an arrangement of polarized beam splitters used for selectively supplying specific polarized components to the reflection-type spatial light modulating sections, wherein adverse effects of unnecessary polarized components produced by the polarized beam splitters are effectively suppressed.

Another object of the present invention is to provide an arrangement of an illumination apparatus capable of suppressing the fluctuation of the illumination light caused by the convection of light source gas as well as providing bright illumination.

In order to accomplish the above and other related objects, the present invention provides a projection-type display apparatus comprising an illumination apparatus, a color separating/light guiding optics located at a predetermined deck, and a light modulating/color compositing/image projecting optics located at another deck. The illumination apparatus comprises a light source. The color separating/light guiding optics separates white color light emitted from the light source into three primary color beams and guides the separated primary color beams toward the light modulating/color compositing/image projecting optics. The light modulating/color compositing/image projecting optics comprises a cross-type dichroic prism with two reflection films crossing each other and having wavelength selectivity for selecting two of three primary colors, a projection lens disposed at an outgoing surface of the cross-type dichroic prism, polarized beam splitters having outgoing surfaces respectively facing to three incident surfaces of the cross-type dichroic prism and incident surfaces for receiving the separated primary color beams incoming from the color separating/light guiding optics, and the reflection-type spatial light modulating sections respectively facing to other surfaces opposing to the outgoing surfaces of the polarized beam splitters. A plane region occupied by the color separating/light guiding optics is entirely involved in a plane region occupied by the light modulating/color compositing/image projecting optics when seen from an up-and-down direction.

With this arrangement, the plane region occupied by the color separating/light guiding optics can be effectively reduced to a level comparable with that of the light modulating/color compositing/image projecting optics. This realizes a significant downsizing of the apparatus.

Preferably, the polarized beam splitters have polarizing films directed in predetermined directions in such a manner that the incident surfaces of the polarized beam splitters face toward the color separating/light guiding optics.

Preferably, the color separating/light guiding optics comprises two independent dichroic mirrors and a plurality of reflection mirrors.

Preferably, the color separating/light guiding optics guides first and second primary color beams along first and second optical paths identical in length and extending from the light source to corresponding polarized beam splitters facing to neighboring incident surfaces of the cross-type dichroic prism of the light modulating/color compositing/image projecting optics. The color separating/light guiding optics guides a third primary color beam along a third optical path serving as a detoured optical path longer than the first and second optical paths and extending from the light source to the corresponding polarized beam splitter across a dead space below the projection lens of the light modulating/color compositing/image projecting optics. And, at least one correcting lens is provided in the detoured third optical path to substantially equalize the optical path length of the third primary color beam with those of the first and second primary color beams.

Accordingly, the dead space is utilized for the detoured optical path of the color separating/light guiding optics for guiding one of the primary color beams to the corresponding polarized beam splitter. The detoured optical path provided a sufficient physical space for installing the required correcting lenses.

Preferably, an intermediate deck of a polarized light selecting optics is interposed between the two decks. The polarized light selecting optics comprises three polarized beam splitters facing to corresponding incident surfaces of respective polarized beam splitters of the light modulating/color compositing/image projecting optics. Each of the polarized beam splitters of the polarized light selecting optics allows one polarized component of the corresponding primary color beam to pass through and enter the corresponding polarized beam splitter of the light modulating/color compositing/image projecting optics and reflects the other polarized component in a direction different from the one polarized component.

Furthermore, the present invention proposes an arrangement of the polarized beam splitter located in the polarized light selecting optics. A reflection film is provided at a side surface of the polarized beam splitter for reflecting another polarized component having a polarization plane normal to the specific polarization plane.

With this arrangement, unnecessary polarized component returns to the light source without giving adverse effects to the component members.

Moreover, the present invention proposes an arrangement of the illumination apparatus. Preferably, the light source is a xenon lamp equipped with a convergence-type reflector and an illuminating device for unifying an illuminance distribution. The illuminating device may comprise a collimator lens and a pair of fly-eye lenses, and the collimator lens has a spherical aberration not smaller than 0.01 f. Alternatively, the illuminating device may comprise a light pipe having a rectangular hollow space defined by an aspect ratio of 3:4 and a diagonal aperture length of 5 to 10 mm, and the light pipe is located in the vicinity of a second focal point of the xenon lamp.

With this arrangement, it becomes possible to suppress the fluctuation of the illumination light caused by the convection of the xenon gas. The flicker is suppressed and the illuminance is improved.

BRIEF DESCRIPTION OF THE DRAWINGS

The above and other objects, features and advantages of the present invention will become more apparent from the following detailed description which is to be read in conjunction with the attached drawings, in which.

DESCRIPTION OF THE PREFERRED EMBODIMENTS

Applicant's Earlier Application

The applicant has previously proposed a projection-type display apparatus using reflection-type spatial light modulating sections (refer to the unpublished Japanese patent application No. 9-10065). A color separating device provided in this projection-type display apparatus uses two dichroic mirrors having reflection surfaces crossing each other in an X shape. The arrangement of the color separating/light guiding optics is symmetrical with respect to three primary colors. The length of each primary color beam path extending from the light source to the corresponding spatial light modulating section is identical with those of two others primary beams.

The projection-type display apparatus using the cross-type dichroic mirrors is free from the color shading problem because of their symmetrical optical paths of the three primary colors that are identical in the length from the light source to the spatial light modulating section. However, according to the arrangement of this projection-type display apparatus, the color separating device uses two glass plates crossing each other and coated by the reflection films having the wavelength selectivity. Accordingly, after entering this color separating device, the light causes multiple reflections in the vicinity of the crossing portion of two glass plates. Part of the light cannot go out of the color separating device. This causes a dark shade at a central region of the projected picture or image.

Furthermore, as each spatial light modulating section is a reflection type, the reflection beams of the unmodulated polarized components return to the cross-type dichroic mirrors and may pass through them or cause multiple reflections therein. As a result, there is a tendency that the returning beam of a certain color may enter the spatial light modulating section of other color. This causes unnecessary bright lines or abnormal colors in the projected picture or image, significantly deteriorating the quality of display.

There is another projection-type display apparatus using transmission-type spatial light modulating sections (as proposed in the published international patent application No. WO94/22042). A color separating device provided in this projection-type display apparatus uses two dichroic mirrors that are arranged asymmetrically with respect to the optical path of three primary color beams. A correction lens is provided in the elongated optical path of a primary color beam for correcting a light quantity loss. With this correction lens, the optical length of this primary color beam from the light source to the corresponding spatial light modulating section is substantially equalized with those of two other primary color beams.

COMPARATIVE EMBODIMENT

FIGS. 7 to 10 show a practical application of the color separating/light guiding optics disclosed in the above-identified international patent application to a projection-type display apparatus using the reflection-type spatial light modulating sections.

Figure 8:
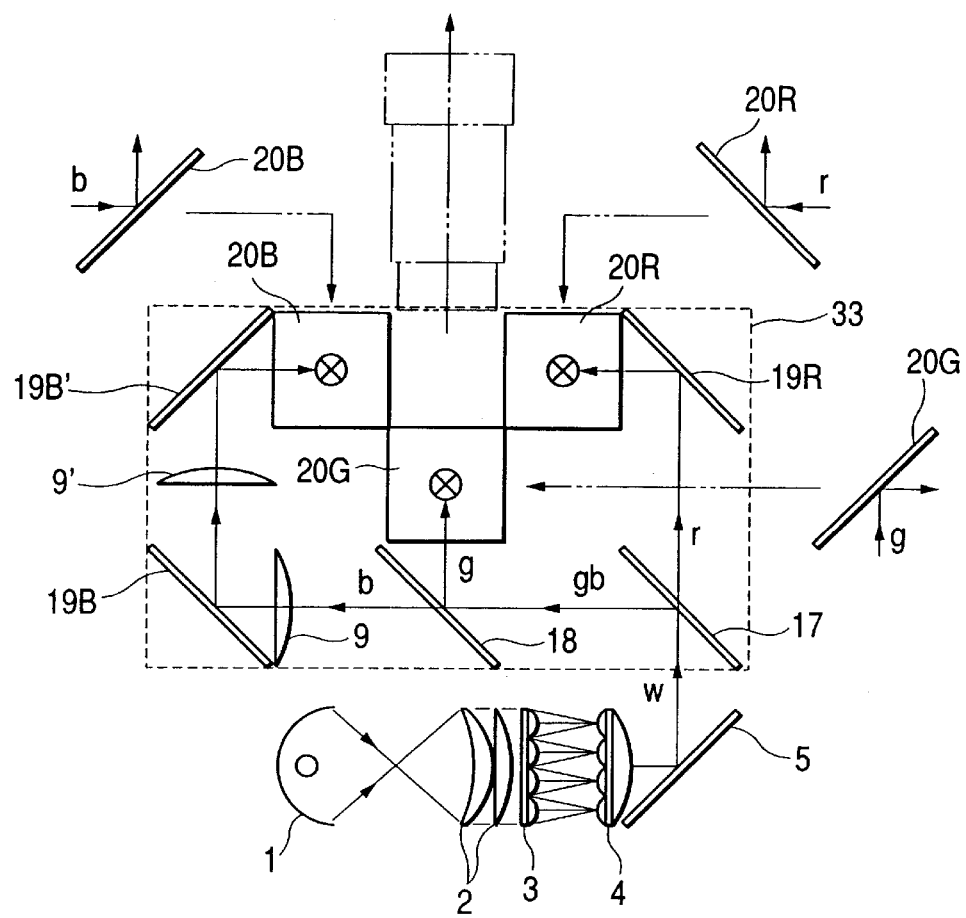
FIG. 8 is a plan view showing a lower deck of the comparative projection-type display apparatus seen from the bottom, that comprises a light source and a color separating/light guiding optics.
Figure 9:
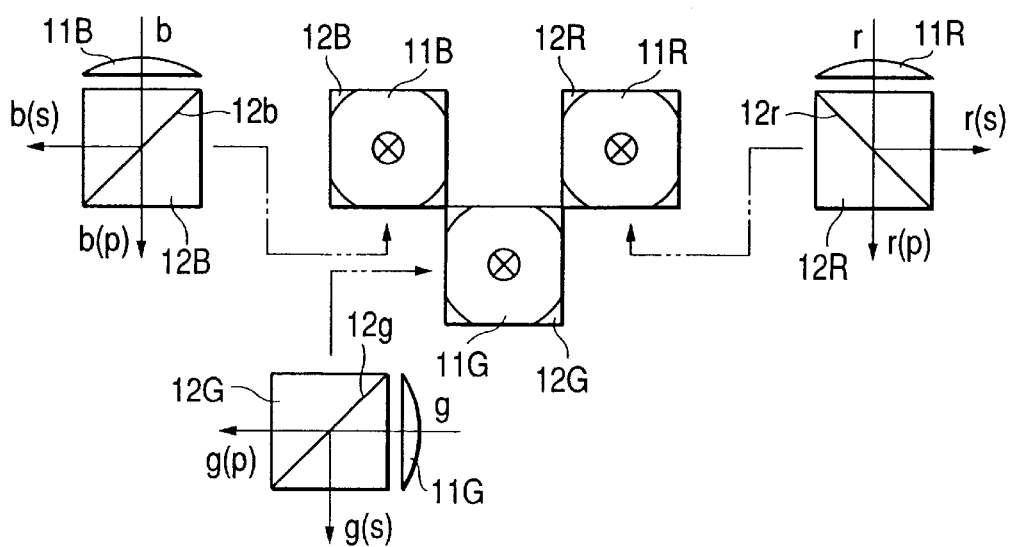
FIG. 9 is a plan view showing a middle deck of the comparative projection-type display apparatus seen from the bottom, that comprises a polarized light selecting optics.
Figure 10:
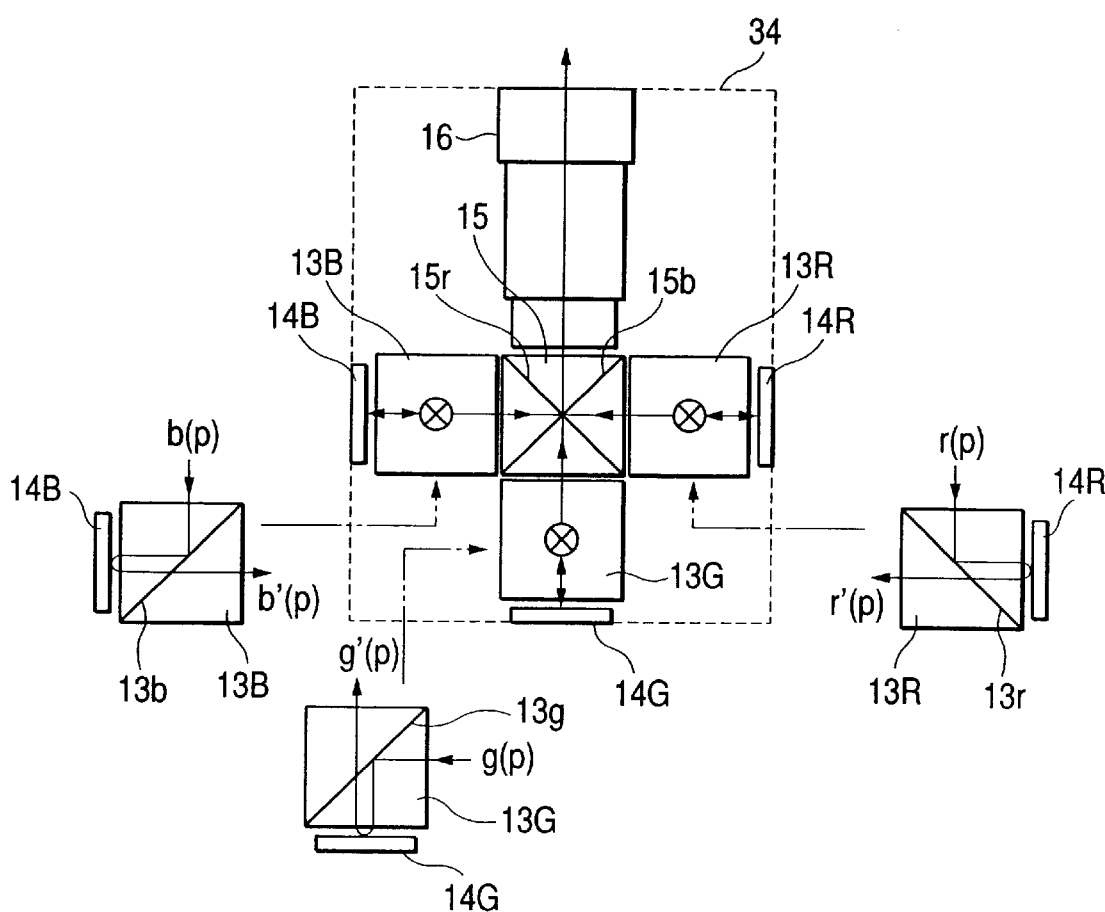
FIG. 10 is a plan view showing an upper deck of the comparative projection-type display apparatus seen from the bottom, that comprises a light modulating/color compositing/image projecting optics.

The optical arrangement of this projection-type display apparatus is roughly separated into three multilayered sections of a color separating/light guiding optics located at a lower deck, a polarized light selecting optics located at a meddle deck, and a light modulating/color compositing/image projecting optics located at a higher deck. FIGS. 8 through 10 are plan views showing respective optics seen from the bottom.

FIG. 8 shows a light source 1, a collimator lens 2, a first integrator 3, a second integrator 4, and a cold mirror 5. A dichroic mirror 17 separates the white light into a cyan beam (i.e., mixed light of a green color and a blue color) "gb" and a red beam "r." Another dichroic mirror 18 separates the cyan beam "gb" into a green beam "g" and a blue beam "b." A plurality of reflection mirrors 19B, 19B', 19R, 20G, 20B and 20R reflect the beams. Two correcting lenses 9 and 9' correct the loss of light quantity. FIG. 9 shows convergence lenses 11G, 11B and 11R and first polarized beam splitters 12G, 12B and 12R. FIG. 10 shows second polarized beam splitters 13G 13B and 13R, spatial light modulating sections 14G, 14B and 14R each being a reflection type using a liquid crystal, a cross-type dichroic prism 15 that composites respective color beams, and a projection lens 16 that projects the composite light.

FIGS. 8 to 10 include several reference views illustrating optical functions of the lower, middle and upper decks of the projection-type display apparatus. The plan view of FIG. 8 is combined with a total of three side views respectively showing the reflection mirrors 20G, 20B and 20R each seen from a corresponding alternating long and two short dashes line. Similarly, the plan view of FIG. 9 is combined with three side views showing three combined units 11G/12G, 11B/12B and 11R/12R each seen from a corresponding alternating long and two short dashes line. Respective combined units 11G/12G, 11B/12B and 11R/12R comprise a pair of the convergence lens and the first polarized. beam splitter 11G and 12G, 11B and 12B, and 11R and 12R. The plan view of FIG. 10 is combined with three side views showing the three combined units 13G/14G, 13B/14B and 13R/14R each seen from a corresponding alternating long and two short dashes line. Respective combined units 13G/14G, 13B/14B and 13R/14R include a pair of the second polarized beam splitter and the reflection-type spatial light modulation section 13G and 14G, 13B and 14B, and 13R and 14R.

First of all, in the color separating/light guiding optics, the light source 1 comprising an elliptic reflection mirror emits the white light "w." The white light "w" once converges at a second focal point of the elliptic reflection mirror. Then, the white light "w" is converted into parallel beams by the collimator lens 2. The parallel beams outgoing from the collimator lens 2 illuminate the first integrator 3.

The first integrator 3 and the second integrator 4 comprise a plurality of small lens segments arranged in a predetermined matrix pattern. The parallel beams, after passing through the lens segments of the first integrator 3, converge on the corresponding lens segments of the second integrator 4. The first and second integrators 3 and 4 cooperatively function to average or flatten the luminance (or brightness) distribution of the light source image. Accordingly, the reading light resulting from the second integrator 4 has a uniform illuminance distribution for each of the spatial light modulating sections 14G, 14B and 14R.

Furthermore, after passing through the second integrator 4, the white light "w" is reflected by the cold mirror 5. When passing through the cold mirror 5, unnecessary infrared rays are removed from the white light "w." Next, after being reflected by the cold mirror 5, the white light "w" advances forward along the same horizontal surface with an advance direction normal to its incoming direction. The white light "w" arrives at the dichroic mirror 17. A reflection film of the dichroic mirror 17 has the capability of selectively reflecting specific wavelength components and allowing the rest to pass through. Due to this wavelength selectivity, the dichroic mirror 17 separates the white light "w" into a cyan beam "gb" reflected by the dichroic mirror 17 and a red beam "r" passing through the dichroic mirror 17 both advancing on the same horizontal plane. The cyan beam "gb" has an advance direction 90° different from that of the white light "w" as a result of the reflection on the refection film of the dichroic mirror 17. The red beam "r" has an advance direction identical with that of the white light "w."

Furthermore, the cyan beam "gb" outgoing from the dichroic mirror 17 arrives at the dichroic mirror 18. The dichroic mirror 18 has the wavelength selectivity in the same manner as the dichroic mirror 17. The dichroic mirror 18 separates the cyan beam "gb" into a green beam "g" reflected forward by the dichroic mirror 18 and a blue beam "b" passing through the dichroic mirror 18 both advancing on the same horizontal plane. The green beam "g" has an advance direction 90° different from that of the cyan beam "gb" as a result of the reflection on a refection film of the dichroic mirror 18. The blue beam "b" has an advance direction identical with that of the cyan beam "gb."

Accordingly, the white light "w" is finally separated into three primary beams by the function of two dichroic mirrors 17 and 18 provided in the abovedescribed light guide path arrangement.

The green beam "g" outgoing forward from the dichroic mirror 18 directly arrives at the reflection mirror 20G. The reflection mirror 20G reflects the green beam "g" upward so as to change the advance direction of the green beam "g" by an amount of 90°. The red beam "r" outgoing from the dichroic mirror 17 arrives at the reflection mirror 19R. The reflection mirror 19R reflects the red beam "r" to change its advance direction by 90° on the same horizontal plane. Then, the reflection mirror 20R reflects the red beam "r" upward so as to further change the advance direction of the red beam "r" by 90°. After being reflected upward by the reflection mirrors 20G and 20R, the green beam and the red beam enter the convergence lenses 11G and 11R placed directly above the reflection mirrors 20G and 20R, respectively.

On the other hand, the blue beam "b" outgoing from the dichroic mirror 18 is subjected to the convergence correction through the correcting lenses 9 and 9' and the 90° reflections at two reflection mirrors 19B and 19B' on the same horizontal plane. Thus, the blue beam "b" advances along a detoured optical path and arrives at the reflection mirror 20B. The reflection mirror 20B reflects the blue beam "b"

upward so as to change the advance direction of the blue beam "b" by 90°. Then, the blue beam "b" enters the convergence lense 11B placed directly above the reflection mirror 20B.

The three combined units 11G/12G, 11B/12B and 11R/12R, each comprising the convergence lens and the associated first polarized beam splitter, constitute the polarized light selecting optics. These three combined units 11G/12G, 11B/12B and 11R/12R are connected at their corners as shown in FIG. 9 and symmetrically arranged with respect to a projecting direction. Respective primary color beams "g", "b" and "r", supplied from the color separating/light guiding optics, enter the convergence lenses 11G, 11B and 11R, respectively. The convergence lenses 11G, 11B and 11R convert the primary color beams "g", "b" and "r" into parallel beams that subsequently enter the corresponding first polarized beam splitters 12G, 12B and 12R, respectively.

The polarized beam splitters 12G, 12B and 12R comprise polarizing films 12g, 12b and 12r consisting of two kinds of numerous films alternately laminated. The polarized beam splitters 12G, 12B and 12R receive the primary color beams "g", "b" and "r" that are indefinite polarized light beams. The polarized beam splitters 12G, 12B and 12R allow P-polarized components g(p), b(p) and r(p) of the primary color beams "g", "b" and "r" to pass through, and reflect S-polarized components g(s), b(s) and r(s) in the directions different from those of the P-polarized components g(p), b(p) and r(p). In other words, the polarized beam splitters 12G, 12B and 12R select only the P-polarized components g(p), b(p) and r(p) from the primary color beams "g", "b" and "r" as the light to be used for displaying images and abandon the S-polarized components g(s), b(s) and r(s) at this stage.

Accordingly, after the primary color beams "g", "b" and "r" passed through the first polarized beam splitters 12G, 12B and 12R, only the P-polarized components g(p), b(p) and r(p) enter the second polarized beam splitters 13G, 13B and 13R located directly above the first polarized beam splitters 12G, 12B and 12R, respectively.

The three combined units 13G/14G, 13B/14B and 13R/14R, each comprising the second polarized beam splitter and the associated spatial light modulating section, are located in the light modulating/color compositing/image projecting optics. Respective combined units 13G/14G, 13B/14B and 13R/14R confront with the corresponding incident surfaces of the cross-type dichroic prism 15 as shown in FIG. 10 and symmetrically arranged with respect to the projecting direction.

In the same manner as the above-described first polarized beam splitters 12G 12B and 12R, the second polarized beam splitters 13G 13B and 13R have polarizing films 13g, 13b and 13r allowing only the P-polarized components g(p), b(p) and r(p) to pass through and reflecting the S-polarized components g(s), b(s) and r(s). The inclined directions of the polarizing films 13g, 13b and 13r are twisted by an angle of 90° with respect to the corresponding polarizing films 12g, 12b and 12r of the first polarized beam splitters 12G, 12B and 12R. The P-polarized components g(p), b(p) and r(p) entering the second polarized beam splitters 13G, 13B and 13R are directed along the vibration directions of the S-polarized components.

Accordingly, the P-polarized components g(p), b(p) and r(p) are reflected by the polarizing films 13g, 13b and 13r of the second polarized beam splitters 13G, 13B and 13R. The reflected P-polarized components g(p), b(p) and r(p) advance in horizontal directions normal to their vertical incoming directions to the polarizing films 13g, 13b and 13r. Then, the P-polarized components g(p), b(p) and r(p) enter the corresponding spatial light modulating sections 14G, 14B and 14R, respectively.

Respective spatial light modulating sections 14G, 14B and 14R control the orientation of each pixel in the liquid crystal layer to modulate the entered P-polarized components g(p), b(p) and r(p), and reflect modulated beams g'(p), b'(p) and r'(p) in the directions opposed to their incoming directions. The modulated beams g'(p), b'(p) and r'(p) have polarized light components in accordance with their modulation degrees. The reflected modulated beams g'(p), b'(p) and r'(p) enter the polarizing films 13g, 13b and 13r of the second polarized beam splitters 13G, 13B and 13R, respectively.

As explained in the foregoing description, the polarizing films 13g, 13b and 13r reflect only the S-polarized components and allow the P-polarized components to pass through. Accordingly, the reflected modulated beams g'(p), b'(p) and r'(p) pass through the polarizing films 13g, 13b and 13r and enter the cross-type dichroic prism 15. The cross-type dichroic prism 15 combines or mixes the entered modulated beams g'(p), b'(p) and r'(p) to produce composite light. On the other hand, although not shown, unmodulated polarized components g'(s), b'(s) and r'(s) advance reversely along their incoming optical paths toward the light source 1 as returning beams after being reflected by the polarizing films 13g, 13b and 13r.

The cross-type dichroic prism 15 has a dichroic mirror surface 15b reflecting only the blue beam "b" and a dichroic mirror surface 15r reflecting only the red beam "r" arranged in a cross relationship. Thus, the cross-type dichroic prism 15 receive the modulated beams b'(p) and r'(p) supplied from the second polarized beam splitters 13B and 13R and changes the advance directions of the modulated beams b'(p) and r'(p) forward by 90° on the same horizontal plane. Meanwhile, the modulation beam g'(p) entering from the second polarized beam splitter 13G penetrates the cross-type dichroic prism 15 and advances straight without any reflections.

Accordingly, respective modulation beams of the primary colors are combined or mixed in the cross-type dichroic prism 15 as the composite light. Then, the composite light enters the projection lens 16 that enlarges the color picture or image. The enlarged picture or image is displayed on a screen (not shown).

According to the comparative projection-type display device shown in FIGS. 7 through 10, two independent dichroic mirrors 17 and 18 are used as part of the color separating device. Therefore, this projection-type display apparatus is free from the above-described problems of the dark shade caused at a central region or the unnecessary bright lines or abnormal colors appearing on the projected picture or image.

However, when seen in an up-and-down direction as shown in the plan view of FIG. 8, the color separating/light guiding optics occupies a horizontally enlarged area larger than those of the polarized light selecting optics and the light modulating/color compositing/image projecting optics. In other words, the above-described comparative projection-type display apparatus requires a large installation space for the large optical components to be placed at both sides and the rear side. This makes it difficult to downsize the apparatus body.

More specifically, in each of the polarized light selecting optics and the light modulating/color compositing/image projecting optics, the optical components are arranged symmetrically about the cross-type dichroic prism 15. Their arrangements are relatively compact. On the other hand, the color separating/light guiding optics occupies a large horizontally enlarged area. Accordingly, the above-described projection-type display apparatus requires a large spatial volume for the color separating/light guiding optics. This significantly increases an overall size of the apparatus body.

PREFERABLE EMBODIMENT OF THE PRESENT INVENTION (1) Overall Arrangement

Figure 1:
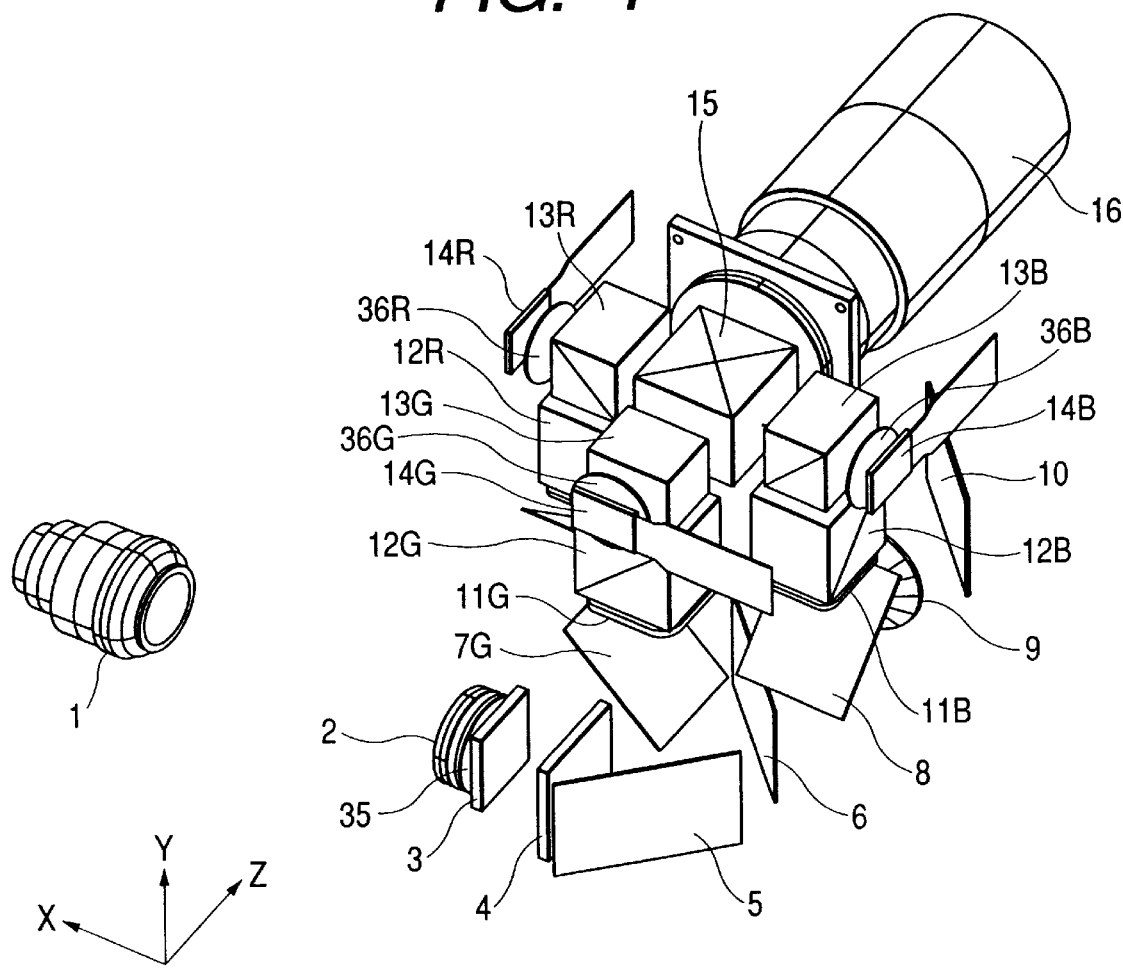
FIG. 1 is a perspective view showing an arrangement of optical components of a projection-type display apparatus in accordance with a preferred embodiment of the present invention, seen from an upper oblique viewpoint.
Figure 2:
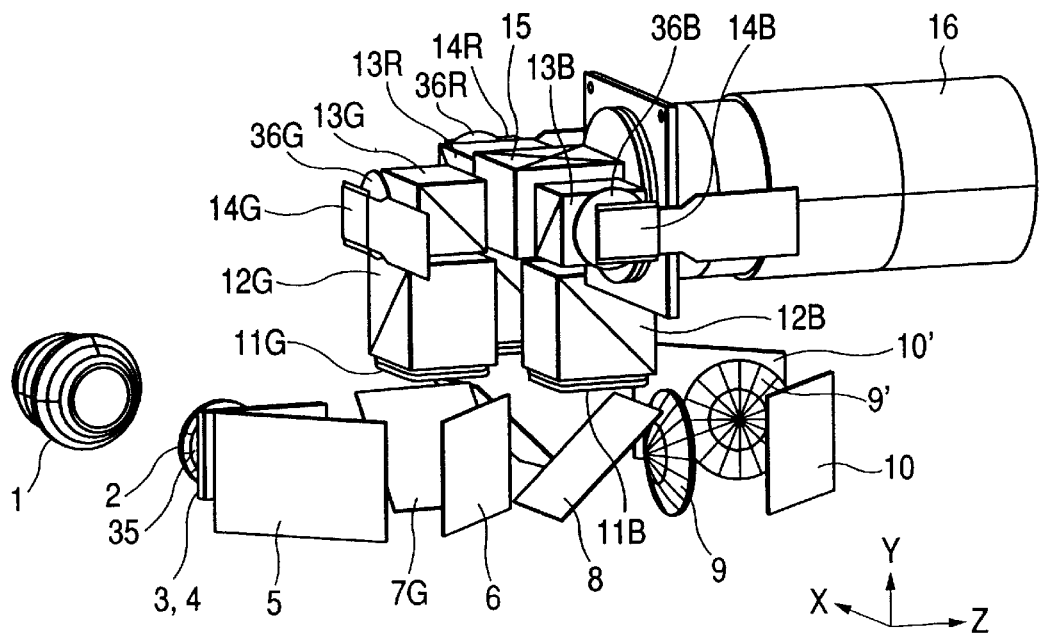
FIG. 2 is a perspective view showing the arrangement of the optical components of the projection-type display apparatus in accordance with the preferred embodiment of the present invention, seen from a side oblique viewpoint.
Figure 3:
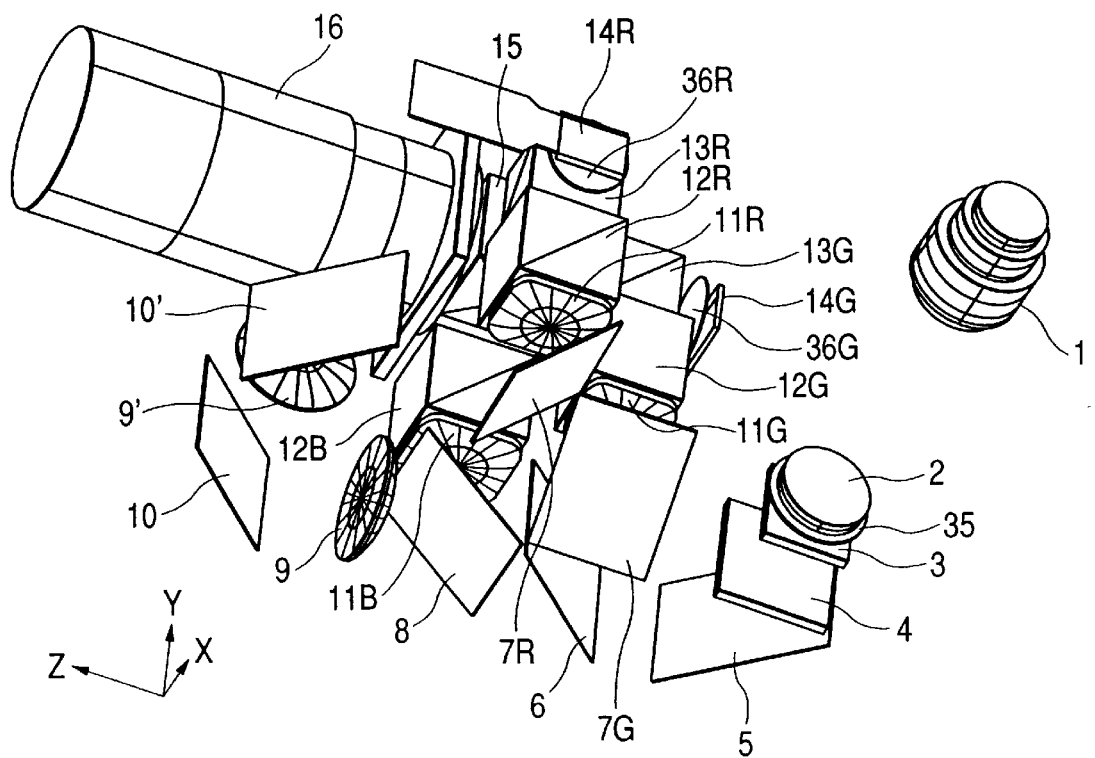
FIG. 3 is a perspective view showing the arrangement of the optical components of the projection-type display apparatus in accordance with the preferred embodiment of the present invention, seen from a lower oblique viewpoint.
Figure 4:
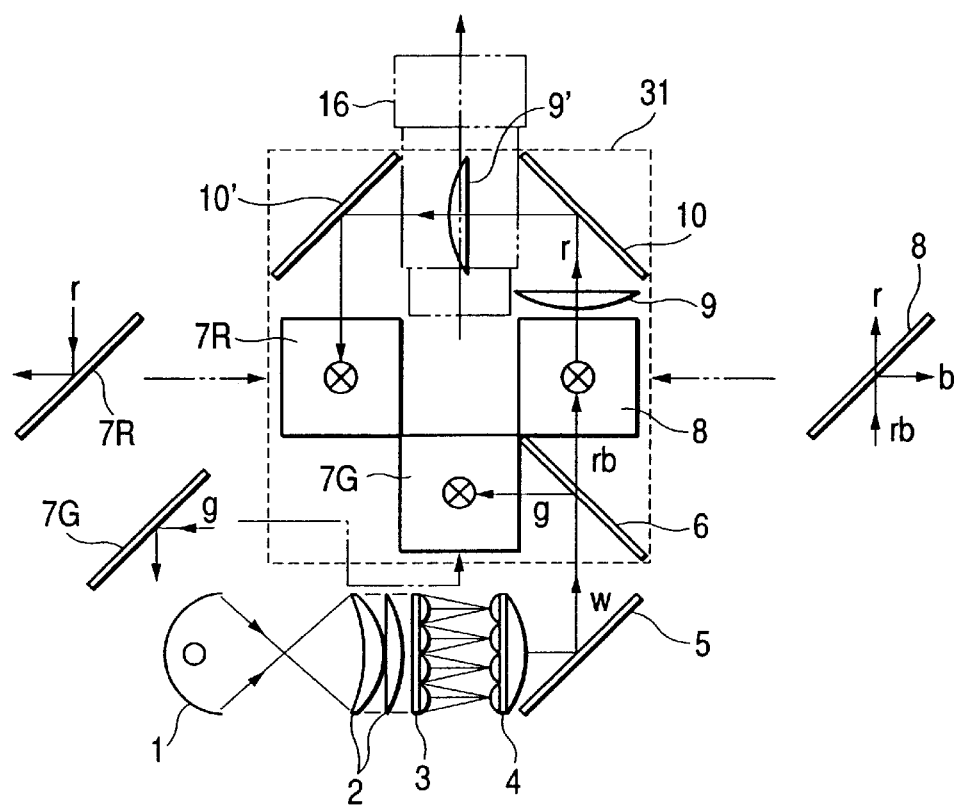
FIG. 4 is a plan view showing a lower deck of the projection-type display apparatus in accordance with the preferred embodiment seen from the bottom, that comprises a light source and a color separating/light guiding optics.
Figure 5:
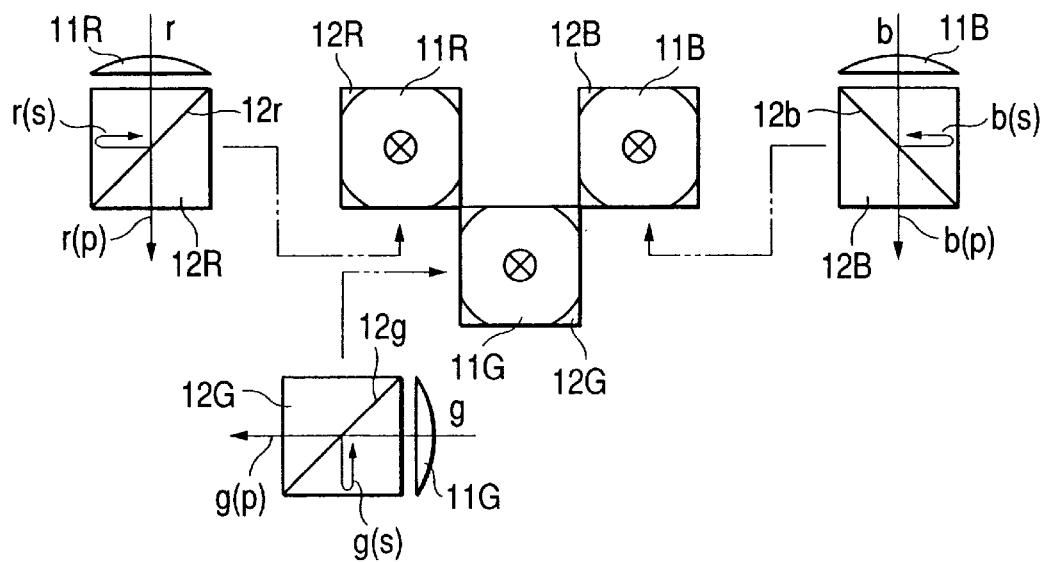
FIG. 5 is a plan view showing a middle deck of the projection-type display apparatus in accordance with the preferred embodiment seen from the bottom, that comprises a polarized light selecting optics.
Figure 6:
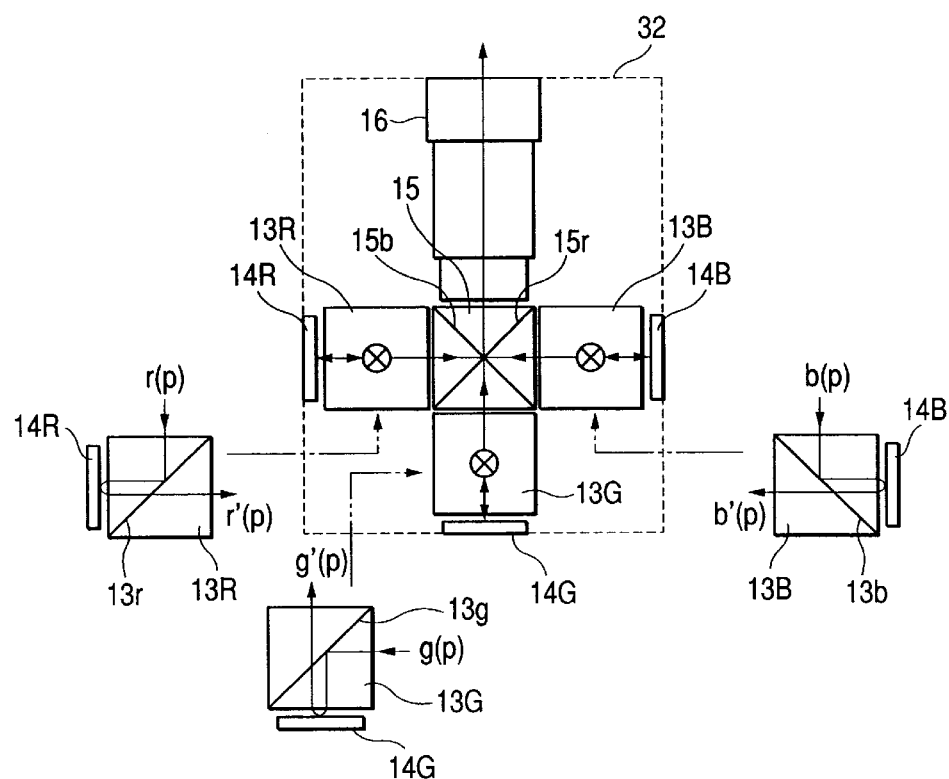
FIG. 6 is a plan view showing an upper deck of the projection-type display apparatus in accordance with the preferred embodiment seen from the bottom, that comprises a light modulating/color compositing/image projecting optics.

A projection-type display apparatus in accordance with the present invention will be explained in greater detail with reference to FIGS. 1 through 6. FIGS. 1 to 3 are perspective views showing an arrangement of optical components of the projection-type display apparatus seen from an upper oblique viewpoint, a side oblique viewpoint, and a lower oblique viewpoint, respectively. FIG. 4 is a plan view showing a lower deck comprising a light source and a color separating/light guiding optics seen from the bottom. FIG. 5 is a plan view showing a middle deck comprising a polarized light selecting optics seen from the bottom. FIG. 6 is a plan view showing an upper deck comprising a light modulating/color compositing/image projecting optics seen from the bottom. The plan views of FIGS. 4 through 6 are combined with reference side views showing specific optical elements each seen from a corresponding alternate long and two short dashes line for explaining functions of these optical elements, in the same manner as in FIGS. 8 through 10.

Like the above-described comparative apparatus shown in FIGS. 7 to 10, the optical arrangement of this projection-type display apparatus is roughly separated into multilayered three sections of a color separating/light guiding optics located at a lower deck, a polarized light selecting optics located at a meddle deck, and a light modulating/color compositing/image projecting optics located at a higher deck.

In FIGS. 1 through 3, the same optical components as those disclosed in FIGS. 7 through 10 are denoted by the same reference numerals and therefore the explanation to those should be referred to the above description.

As apparent from the comparison between FIGS. 5 and 9 and between FIGS. 6 and 10, the polarized light selecting optics and the light modulating/color compositing/image projecting optics of the present invention are substantially the same as those of the above-described comparative embodiment in their fundamental arrangements and optical functions. However, the optical elements of a blue beam and the optical elements of a red color are reversely disposed with respect to the optical axis of the projection lens 16.

The characteristic features of the present invention resides in the arrangement of the color separating/light guiding optics and the layout of its optical elements shown in FIGS. 2 and 3, particularly in FIG. 4.

A dichroic mirror 6 separates the white light "w" into a magenta beam (i.e., mixed light of a red color and a blue color) "rb" and a green beam "g." Another dichroic mirror 8 separates the magenta beam "rb" into a red beam "r" and a blue beam "b." Reflection mirrors 7G and 7R are provided to reflect the green beam "g" and the red beam "r" upward.

The white light "w", emitted from the light source 1, passes through the collimator lens 2, the first integrator 3 and the second integrator 4 successively. The white light "w" is then reflected by the cold mirror 5. The light outgoing from the cold mirror 5 serves as the reading light that includes no infrared rays and has a uniform illuminance distribution. The cold mirror 5 changes the advance direction of the reading light by an angle of 90° on the same horizontal plane. The optical axis of the white light "w", directed forward by the cold mirror 5, is parallel to the optical axis of the projection lens 16 provided in the light modulating/color compositing/image projecting optics. Furthermore, the optical axis of the white light "w" is normal to the optical axis of the convergence lens 11B provided in the polarized light selecting optics (refer to FIG. 5).

The white light "w" arrives at the dichroic mirror 6. The dichroic mirror 6 has a reflection surface inclined at 45° with respect to the optical axis of the incoming white light "w." The dichroic mirror 6 allows the magenta beam "rb" to pass through and reflects the green beam "g" so that the advance direction of the green beam "g" turns 90° on the same horizontal plane. The optical axis of the green beam "g", reflected by the dichroic mirror 6, is normal to the optical axis of the convergence lens 11G.

After being reflected by the dichroic mirror 6, the green beam "g" arrives at the reflection mirror 7G disposed directly below the convergence lens 11G. The reflection mirror 7G has a reflection surface inclined at 45° with respect to the optical axis of the incoming green beam "g." The advance direction of the green beam "g" turns 90° upward on the same vertical plane. After being reflected by the reflection mirror 7G, the green beam "g" enters the convergence lens 11G.

On the other hand, the magenta beam "rb" arrives at the dichroic mirror 8 after passing through the dichroic mirror 6. The dichroic mirror 8 is disposed directly below the convergence lens 11B and has a reflection surface inclined at 45° with respect to the optical axis of the incoming magenta beam "rb."

The dichroic mirror 8 allows the red beam "r" to pass through and reflects the blue beam "b." The advance direction of the blue beam "b" turns 90° upward on the same vertical plane.

Subsequently, the blue beam "b" enters the convergence lens 11B provided in the polarized light selecting optics (refer to FIG. 5).

As apparent from FIG. 4, the optical path extending from the light source 1 to the reflection mirror 7G is identical in length with the optical path extending from the light source 1 to the dichroic mirror 8. Both the polarized light selecting optics and the light modulating/color compositing/image projecting optics, disposed on the color separating/light guiding optics, are symmetrically arranged for each of the three primary color beams. The light modulating/color compositing/image projecting optics comprises the spatial light modulating sections 14G and 14B for the green and blue beams, respectively. Accordingly, the optical path of the green beam "g" extending from the light source 1 to the corresponding spatial light modulating section 14G is identical in length with the optical path of the blue beam "b" extending from the light source 1 to the corresponding spatial light modulating section 14B.

On the other hand, the red beam "r" enters the correcting lens 9 placed on the optical axis of the red beam "r" after passing through the dichroic mirror 8. The red beam "r" is subjected to a predetermined convergence function of the correcting lens 9 and is thereafter reflected by the reflection mirror 10. The advance direction of the red beam "r" turns 90° on the same horizontal plane. Subsequently, the red beam "r" enters another correcting lens 9' placed on the optical axis of the red beam "r" after being reflected by the reflection mirror 10. The red beam "r" is subjected to a predetermined convergence function of the correcting lens 9' and is thereafter reflected by the reflection mirror 10'. The advance direction of the red beam "r" thus turns 90° additionally on the same horizontal plane. Then, the red beam "r" arrives at the reflection mirror 7R placed directly below the convergence lens 11R of the polarized light selecting optics (refer to FIG. 5). The reflection mirror 7R has a reflection surface inclined at 45° with respect to the optical axis of the incoming red beam "r." Then, the red beam "r" enters the convergence lens 11R after being reflected by the reflection mirror 7R.

Namely, the optical arrangement of the above-described embodiment of the present invention provides the detoured optical path extending across a dead space below the projection lens 16 of the light modulating/color compositing/image projecting optics, for guiding the red beam "r" along it to the corresponding convergence lens 11R. Accordingly, the optical path of the red beam "r" extending from the light source 1 to the corresponding spatial light modulating section 14R is longer than those of the green beam "g" and the blue beam "b." However, the undesirable color shading is effectively eliminated by providing the correcting lenses 9 and 9' in the optical path of the red beam "r".

According to the arrangement of the projection-type display apparatus of the above-described embodiment, the color separating/light guiding optics occupies a horizontal rectangular region 31 shown by a dotted line in FIG. 4. The light modulating/color compositing/image projecting optics occupies a horizontal rectangular region 32 shown by a dotted line in FIG. 6. When seen in the up-and-down direction, the former region 31 is entirely involved in the latter region 32.

Therefore, in designing the apparatus, its body size can be determined considering a requisite overall volume given by the following formula.

[(an area of the region 32+an area covering the components 1–5 constituting the light source section)×(a height of three decks)]

Figure 7:
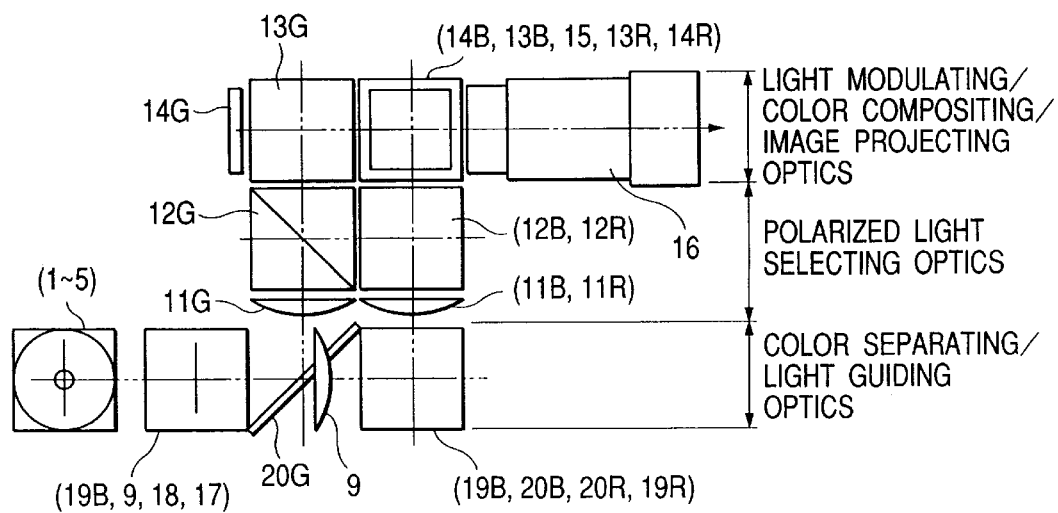
FIG. 7 is a side view showing a comparative projection-type display apparatus.

On the other hand, according to the arrangement of the comparative projection-type display apparatus shown in FIG. 7, the color separating/light guiding optics occupies a horizontal rectangular region 33 shown by a dotted line in FIG. 8. The light modulating/color compositing/image projecting optics occupies a horizontal rectangular region 34 shown by a dotted line in FIG. 10. The region 34 is identical with the region 32. When seen in the up-and-down direction, the region 33 is not entirely involved in the region 34. The region 33 has large overhangs at the both sides thereof that correspond to the mirrors 17, 19R, 19B' and 19B. Furthermore, as apparent from FIG. 7, the region 33 has a large rear overhang corresponding to the mirrors 17, 18 and 19B.

Therefore, in designing the apparatus, its body size needs to be determined considering a requisite overall volume given by the following formula.

[(an area covering both of the regions 33 and 34+an area covering the components 1–5 constituting the light source section)×(a height of three decks)]

The resultant volume is large. To reduce the overall volume, it may be possible to locate the walls of the apparatus body along the outer periphery of the optical components. However, the horizontal area occupied by the apparatus body is fairly large compared with that of the above-described embodiment. The resultant body shape will be complicated. This increases the apparatus size and the manufacturing costs.

In other words, the above-described embodiment provides an optimum arrangement for minimizing the horizontal area occupied by the color separating/light guiding optics that comprises two independent dichroic mirrors 6 and 8, the reflection mirrors 7G, 7R, 10 and 10', and the correcting lenses 9 and 9'. Each primary color beam is guided to the polarized light selecting optics through the minimized color separating/light guiding optics. Thus, the apparatus body is compact.

Moreover, according to the comparative projection-type display apparatus, a total of six reflection mirrors 19R, 20R, 20G, 19B, 19B', and 20B. However, the above-described embodiment of the present invention requires only four reflection mirrors 7G, 7R, 10 and 10'. Thus, the present invention reduces the total number of optical components.

According to the above-described comparative apparatus and the embodiment of the present invention, the polarized light selecting optics is provided at the middle deck. However, the polarized light selecting optics can be omitted if other member possess the polarized light selecting function.

For example, the polarized beam splitters 13G, 13B and 13R of the light modulating/color compositing/image projecting optics can act as the polarized light selecting optics. Nevertheless, providing the polarized light selecting optics makes it possible to select the desirable polarized components beforehand. This is effective to realize a high-quality picture or image display excellent in the contrast ratio.

The projection-type display apparatus of the present invention brings the following effects.

According to the above-described embodiment of the present invention, the projection-type display apparatus comprises the color separating/light guiding optics and the light modulating/color compositing/image projecting optics that are disposed at different decks. The color separating/light guiding optics comprises two independent dichroic mirrors and a plurality of reflection mirrors. With this arrangement, it becomes possible to eliminate the undesirable dark shade of the crossing portion, the unnecessary bright lines and the abnormal colors that are inherent to the projection image obtained by the cross-type dichroic mirrors.

According to the proposed arrangement of the color separating/light guiding optics, at least one of the three primary color beams needs to be guided along a detoured optical path. However, the present invention provides the optimum arrangement for minimizing the horizontal region occupied by the optical components of the color separating/light guiding optics. All the optical components of the color separating/light guiding optics are entirely involved in the minimized horizontal region occupied by the light modulating/color compositing/image projecting optics. Thus, the overall size of the apparatus can be greatly reduced.

Furthermore, according to the arrangement of the above-described embodiment of the present invention, the above-described detoured optical path extends across the dead space below the projection lens of the light modulating/color compositing/image projecting optics. The detoured optical path provides a sufficient space for installing the correcting lenses. The substantial optical path lengths of the three primary color beams can be equalized with each other by the provision of these correcting lenses. This arrangement makes it possible to downsize the apparatus and suppress the undesirable color shading.

Furthermore, according to the arrangement of the above-described embodiment of the present invention, the polarized light selecting optics interposes between the light modulating/color compositing/image projecting optics and the color separating/light guiding optics. This arrangement realizes the high-quality picture or image display excellent in the contrast ratio. Provision of the polarized light selecting optics increases the attitudinal size of the apparatus, although such an increase does not result in a serious increase of the overall size of the apparatus. Regarding the horizontal size of the apparatus, the provision of the polarized light selecting optics cause no substantial increase.

(2) Polarized Beam Splitters

The projection-type display apparatus of the present invention uses the polarized beam splitters to produce the required polarized component for projecting images.

The polarized beam splitter, comprising multilayered films, separates the indefinite polarized light into a polarized component with a specific polarization plane and another polarized component with a polarization plane normal to the above-described specific polarization plane. However, one of the two polarized beams thus produced is unnecessary and abandoned.

In this case, a problem is caused by the unnecessary and abandoned polarized beam that goes out the polarized beam splitter and illuminates the component member of the projection-type display apparatus. The temperature of the illuminated portion of the component member possibly increases. The component member may be deformed, or fused or burned in the worst cases.

To solve this problem, a heat ray cut filter or a cold mirror can be disposed in the optical path of the indefinite polarized light emitted from the light source. Alternatively, a heat ray radiating window can be opened on the installation member. However, providing the heat ray cut filter or the cold mirror cannot obtain satisfactory results. Providing the heat ray radiating window significantly reduces the mechanical strength of the installation member. As a result, the installation member is deformed. This deformation causes optical components mounted on the installation member to dislocate in a relative positional relationship. The positional dislocation between the optical components deteriorates the registration between primary color images in the projected picture formed on the screen.

Figure 11:
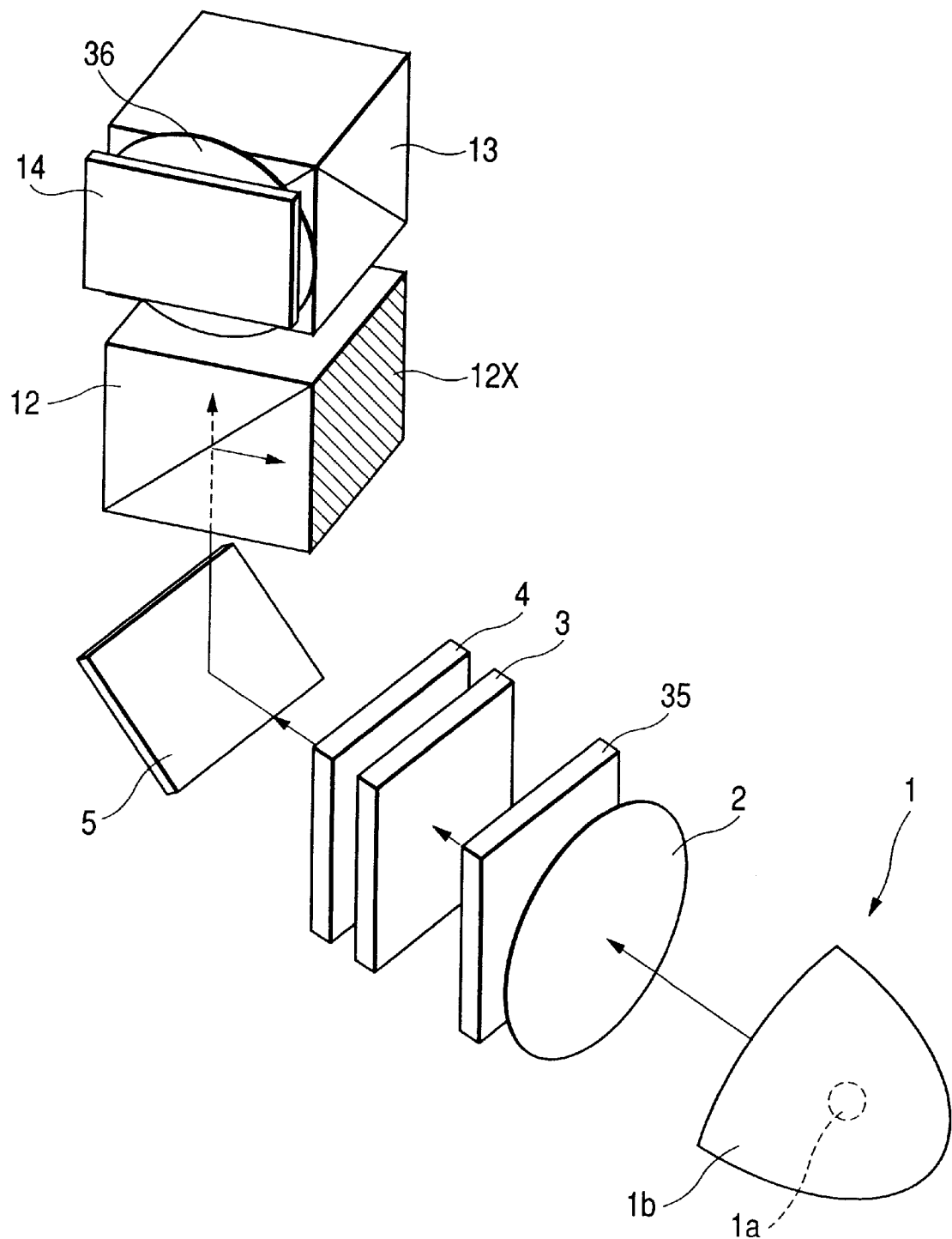
FIG. 11 is a block diagram showing a schematic arrangement of essential components of the projection-type display apparatus in accordance with the present invention.

To solve the problems caused by the unnecessary polarized component, the present invention proposes a desirable arrangement of the polarized beam splitter. FIG. 11 is a block diagram showing a schematic arrangement of the essential optical components of the projection-type display apparatus.

In addition to the components explained in the foregoing description, the projection-type display apparatus of the present invention comprises an infrared ray cut filter 35 that is interposed between the collimator lens 2 and the first integrator 3 and a wavelength plate 36 that is interposed between the second polarized beam splitter 13 and the reflection-type, active matrix patterned, liquid crystal display element (i.e., light modulating section) 14.

The indefinite polarized white light emitted from the light source 1 is converted into parallel beams by the collimator lens 2. The parallel beams arrives at the infrared ray cut filter 35 and passes through it. Then, the filtered indefinite polarized white beams pass through the integrators 3 and 4 and are reflected by the cold mirror 5. The reflected white beams enters the first polarized beam splitter 12.

The first polarized beam splitter 12 separates the incoming indefinite polarized beam into two linear polarized components (S wave and P wave) having polarization planes normal to each other. The first polarized beam splitter 12 has a polarizing film that has multilayered reflection layers constituted by alternately laminating two layers having different refractive indices. The P wave component passes through the polarizing film, goes out of the first polarized beam splitter 12, and then enters into the second polarized beam splitter 13.

The polarized beam, entering in the second polarized beam splitter 13, is reflected by a polarizing film of the second polarized beam splitter 13. The reflected polarized beam goes out of the second polarized beam splitter 13 and arrives at the wavelength plate 36. The beam, passing through the wavelength plate 36, enters as reading light into the reflection-type, active matrix patterned, liquid crystal display element 14.

The reading light goes and returns across the liquid crystal layer of the reflection-type, active matrix patterned, liquid crystal display element 14. During this go-and-return movement, the reading light is subjected to the light modulation that is performed by varying a rotational condition of the polarization plane in response to the image information.

Subsequently, the modulated polarized beam goes out of the reflection-type, active matrix patterned, liquid crystal display element 14 and again enters into the second polarized beam splitter 13. The polarizing film of the second polarized beam splitter 13 allows only the P wave component of the incoming polarized beam to pass through. In this P wave component, the rotational condition of the polarization plane is varied according to the image information. The polarized beam of the P wave component enters in the projection lens 16 (refer to FIGS. 1 to 6) that projects the image of the P component on the screen.

On the other hand, the S wave component is reflected by the polarizing film of the first polarized beam splitter 12 as unnecessary polarized component not used for displaying images. The first polarized beam splitter 12 has a reflection film (e.g., aluminum vaporization film) 12x on a side surface toward which the S wave component advances after being reflected by the polarizing film. The S wave component is reflected by the reflection film 12x and returns toward the polarizing film of the first polarized beam splitter 12. The S wave component is reflected again by the polarizing film and goes out of the first polarized beam splitter 12. The outgoing S wave component advances along a returning optical path passing through the cold mirror 5, the integrators 3 and 4, the infrared ray cut filter 35 and the collimator lens 2 in this order, and finally arrives at the light source 1.

In this manner, the first polarized beam splitter 12 separates the incoming indefinite polarized beam into two linear polarized components (S wave and P wave) having polarization planes normal to each other. One of the two linear polarized components is used as the reading light entering in the reflection-type, active matrix patterned, liquid crystal element 14. The other linear polarized component (i.e., unnecessary polarized component) is reflected by the reflection film 12x provided on the side surface of the first polarized beam splitter 12 to return it to the light source. Therefore, the above-described arrangement can eliminate the heating problem caused by unnecessary polarized beam.

Now returning to FIGS. 1 through 3, the indefinite polarized white light emitted from the light source 1 is converted into parallel beams by the collimator lens 2 and then arrives at the infrared cut filter 35. After passing through the infrared cut filter 35, the indefinite polarized white light passes through the integrators 3 and 4 and is reflected by the cold mirror 5. Then, the indefinite polarized white light enters the color separating/light guiding optics (6, 7G, 7R, 8~10) that includes two independent dichroic mirrors. The color separating/light guiding optics (6, 7G, 7R, 8, 9, 9', 10, 10') separates the incoming indefinite polarized white light into three color beams corresponding to three primary colors of the additive color mixture. The indefinite polarized beams of respective three primary colors enter the corresponding first polarized beam splitters 12G, 12B, and 12R provided independently.

The color separating/light guiding optics comprises the dichroic mirror 6 that reflects the green beam and allows the magenta beam to pass through, the reflection mirror 7G that reflects the green beam upward, and the dichroic mirror 8 that reflects the blue beam upward and allows the red beam to pass through, reflection mirrors 10 and 7R that reflect the red color beams. The reflection mirror 10' is interposed between the reflection mirrors 10 and 7R for reflecting the red beam coming from the reflection mirror 10 toward the reflection mirror 7R. The field lenses 9 and 9', disposed in the optical path of the red color beam, cooperatively function to equalize the optical path length of the red beam with those of other primary color beams.

The first polarized beam splitter 12G separates the indefinite polarized green beam into two linear polarized components (S wave and P wave) having polarization planes normal to each other. The first polarized beam splitter 12B separates the indefinite polarized blue beam into two linear polarized components (S wave and P wave) having polarization planes normal to each other. Furthermore, the first polarized beam splitter 12R separates the indefinite polarized red beam into two linear polarized components (S wave and P wave) having polarization planes normal to each other.

The first polarized beam splitters 12G, 12B and 12R, independently provided for the three primary color beams, have reflection films 12x (e.g., aluminum vaporization films) on their side surfaces for reflecting the unnecessary polarized components, respectively, as explained with reference to FIG. 11. After being reflected by these reflection films 12x, the unnecessary polarized components return toward the polarizing films of the first polarized beam splitters 12G, 12B and 12R. The unnecessary polarized components are reflected again by the polarizing films and go out of the first polarized beam splitters 12G, 12B and 12R. Thus, the unnecessary polarized components (g(s), b(s), r(s)) advance along the returning optical path passing through the color separating/light guiding optics (6, 7G, 7R, 8, 9, 9', 10, 10'), the cold mirror 5, the integrators 3 and 4, the infrared ray cut filter 35 and the collimator lens 2 in this order, and finally arrives at the light source 1.

On the other hand, the necessary polarized components (g(p), b(p), r(p)) used for displaying images, respectively outgoing from the corresponding first polarized beam splitters 12G, 12B and 12R, enter the second polarized beam splitters 13G, 13B and 13R that are independently provided in a confronting relationship with the corresponding first polarized beam splitters 12G, 12B and 12R.

The green beam, entering in the second polarized beam splitter 13G, is reflected by a polarizing film of the second polarized beam splitter 13G. The reflected green beam goes out of the second polarized beam splitter 13G and arrives at the corresponding wavelength plate 36G. The beam, passing through the wavelength plate 36G, enters as the reading light into the corresponding reflection-type, active matrix patterned, liquid crystal display element 14G.

Furthermore, the blue beam, entering in the second polarized beam splitter 13B, is reflected by a polarizing film of the second polarized beam splitter 13B. The reflected blue beam goes out of the second polarized beam splitter 13B and arrives at the corresponding wavelength plate 36B. The beam, passing through the wavelength plate 36B, enters as the reading light into the corresponding reflection-type, active matrix patterned, liquid crystal display element 14B.

Furthermore, the red beam, entering in the second polarized beam splitter 13R, is reflected by a polarizing film of the second polarized beam splitter 13R. The reflected red beam goes out of the second polarized beam splitter 13R and arrives at the corresponding wavelength plate 36R. The beam, passing through the wavelength plate 36R, enters as the reading light into the corresponding reflection-type, active matrix patterned, liquid crystal display element 14R.

The green reading light goes and returns across the liquid crystal layer of the reflection-type, active matrix patterned, liquid crystal display element 14G. During this go-and-return movement, the green reading light is subjected to the light modulation that is performed by varying a rotational condition of the polarization plane in response to the image information of green color. Subsequently, the modulated polarized green beam goes out of the reflection-type, active matrix patterned, liquid crystal display element 14G and again enters into the second polarized beam splitter 13G via the wavelength plate 36G.

The polarizing film of the second polarized beam splitter 13G allows only the P wave component of the incoming polarized green beam to pass through. In this P wave component, the rotational condition of the polarization plane is varied according to the image information of green color. The polarized beam of the P wave component goes out of the second polarized beam splitter 13G and enters into the color compositing dichroic prism 15. The blue reading light goes and returns across the liquid crystal layer of the reflection-type, active matrix patterned, liquid crystal display element 14B. During this go-and-return movement, the blue reading light is subjected to the light modulation that is performed by varying a rotational condition of the polarization plane in response to the image information of blue color. Subsequently, the modulated polarized blue beam goes out of the reflection-type, active matrix patterned, liquid crystal display element 14B and again enters into the second polarized beam splitter 13B via the wavelength plate 36B.

The polarizing film of the second polarized beam splitter 13B allows only the P wave component of the incoming polarized blue beam to pass through. In this P wave component, the rotational condition of the polarization plane is varied according to the image information of blue color. The polarized beam of the P wave component goes out of the second polarized beam splitter 13B and enters into the color compositing dichroic prism 15.

The red reading light goes and returns across the liquid crystal layer of the reflection-type, active matrix patterned, liquid crystal display element 14R. During this go-and-return movement, the red reading light is subjected to the light modulation that is performed by varying a rotational condition of the polarization plane in response to the image information of red color. Subsequently, the modulated polarized red beam goes out of the reflection-type, active matrix patterned, liquid crystal display element 14R and again enters into the second polarized beam splitter 13R via the wavelength plate 36R.

The polarizing film of the second polarized beam splitter 13R allows only the P wave component of the incoming polarized red beam to pass through. In this P wave component, the rotational condition of the polarization plane is varied according to the image information of red color. The polarized beam of the P wave component goes out of the second polarized beam splitter 13R and enters into the color compositing dichroic prism 15.

The color compositing dichroic prism 15 composites the incoming three primary color beams (g'(p), b'(p), r'(p)) that are intensity-modulated in accordance with the related image information. The composited light enters into the projection lens 16 that displays the color image on a screen.

The reflection-type liquid crystal elements used in the preset invention are not limited to the reflection-type, active matrix patterned, liquid crystal elements. Therefore, when the present invention is practically embodied, the reflection-type, active matrix patterned, liquid crystal elements can be replaced by reflection-type spatial light modulating elements of optical writing type or electric writing type that use the liquid crystal as a light modulating member.

As apparent from the foregoing description, the present invention provides a projection-type display apparatus comprising a light source for emitting indefinite polarized light and at least one polarized beam splitter provided in an optical path extending from the light source to a light modulating section for receiving the indefinite polarized beam emitted from the light source and selectively producing a polarized component having a specific polarization plane as an image display beam, wherein the polarized beam splitter has a reflection surface for reflecting another polarized component having a polarization plane normal to the specific polarization plane.

Furthermore, the present invention provides a projection-type display apparatus comprising: a light source for emitting indefinite polarized light; a first polarized beam splitter for receiving the indefinite polarized beam supplied from the light source and selectively producing a polarized component having a specific polarization plane as an image display beam; a reflection-type liquid crystal display element for receiving the image display beam via a second polarized beam splitter and modulating the image display beam in accordance with image information; and a projection lens for receiving the modulated image display beam incoming from the reflection-type liquid crystal display element via the second polarized beam splitter and projecting a received image on a screen, wherein the first polarized beam splitter has a reflection surface for reflecting another polarized component having a polarization plane normal to the specific polarization plane.

Furthermore, the present invention provides a projection-type display apparatus comprising: a light source for emitting indefinite polarized white light; a color separating/light guiding optics for separating the indefinite polarized white light into three color beams corresponding to three primary colors of additive color mixture; first polarized beam splitters provided for the three color beams, each receiving a corresponding polarized color beam and selectively producing a polarized component having a specific polarization plane as an image display color beam; reflection-type liquid crystal display elements associated with the first polarized beam splitters via intervening second polarized beam splitters, each reflection-type liquid crystal display element receiving a corresponding image display color beam via the corresponding second polarized beam splitter and modulating the image display color beam in accordance with image information relating to the corresponding primary color; a color compositing means for receiving the modulated image display color beams incoming from the reflection-type liquid crystal display elements via the second polarized beam splitters and producing a composite image display beam; a projection lens for receiving the composite image display beam and projecting a composite image on a screen, wherein each of the first polarized beam splitters has a reflection surface for reflecting another polarized component having a polarization plane normal to the specific polarization plane.

With this arrangement, the indefinite polarized light emitted from the light source is supplied to the polarized beam splitter that selectively produces the polarized component with the specific polarization plane. The selected polarized component is effectively used as the image display light. On the other hand, the unnecessary polarized component is reflected by the reflection film provided on the side surface of the polarized beam splitter and returns to the light source without illuminating the optical components. Hence, the present invention prevents the optical components from being fused or burned by the illumination of the unnecessary polarized component. Furthermore, the present invention prevents the installation member of the optical components from locally deforming due to the thermal expansion by the illumination of the unnecessary polarized component. This is effective to prevent the optical components from being dislocated in the relative positional relationship. Thus, the present invention solves the problem of the deteriorated registration between the primary color images in the projected picture formed on the screen.

(3) Illuminating Device

Regarding the light source for the projection-type display apparatus, metal halide lamps having 150~250 W power have a light emitting efficiency in a range of 60~75 lm/W and are widely used for liquid crystal projectors. The light-emitting principle of the metal halide lamp relies on a highly efficient light emission of the metal halide. However, in an optical arrangement of the metal halide lamp, the light-emitting portion (i.e., light source) occupies a large space. For example, when the life of the metal halide lamp is taken into consideration, it is necessary to maintain at least 3 mm gap between electrodes for a 250 W class halide lamp. In addition to the scale of light emission of the metal halide, the size of the light-emitting section cannot be neglected in the optical function and effect.

On the other hand, the xenon lamp is generally known as having a light emitting section whose size is comparable with a point light source. However, for a bulb-type xenon lamp, the reduction of the electrode gap is limited to a certain degree. Furthermore, there is a possibility that the bulb-type xenon lamp may explode. However, according to a recently development, it is proposed to use a ceramic body for a reflector equipped xenon lamp. This greatly reduces the gap length between the electrodes. For example, it is possible to provide a xenon lamp having a long life even when the electrode gap is approximately 1 mm.

The light emitting efficiency of the above-described reflector equipped xenon lamp is in a range of 20~30 lm/W that is roughly half of that of the metal halide lamp. However, the light-emitting principle of the xenon lamp is based on light emission by the xenon gas. Accordingly, even if the power is increased up to 500 W, the reflector equipped xenon lamp has a very small light-emitting section with the capability of realizing excellent convergence characteristics. Therefore, the xenon lamp can provide excellent fluxes for projecting images compared with those of the metal halide lamp.

According to the above-described reflector equipped xenon lamp, its optical arrangement can be significantly simplified due to the shortened electrode gap and the point-like light source. However, the xenon gas stored in the reflector causes large convection of the xenon gas when the lamp is turned on. This convection induces large fluctuation of illumination light on the screen.

To solve the above-described problems, the present invention proposes a preferable arrangement of the illumination apparatus for the projection-type display apparatus.

Figure 12:
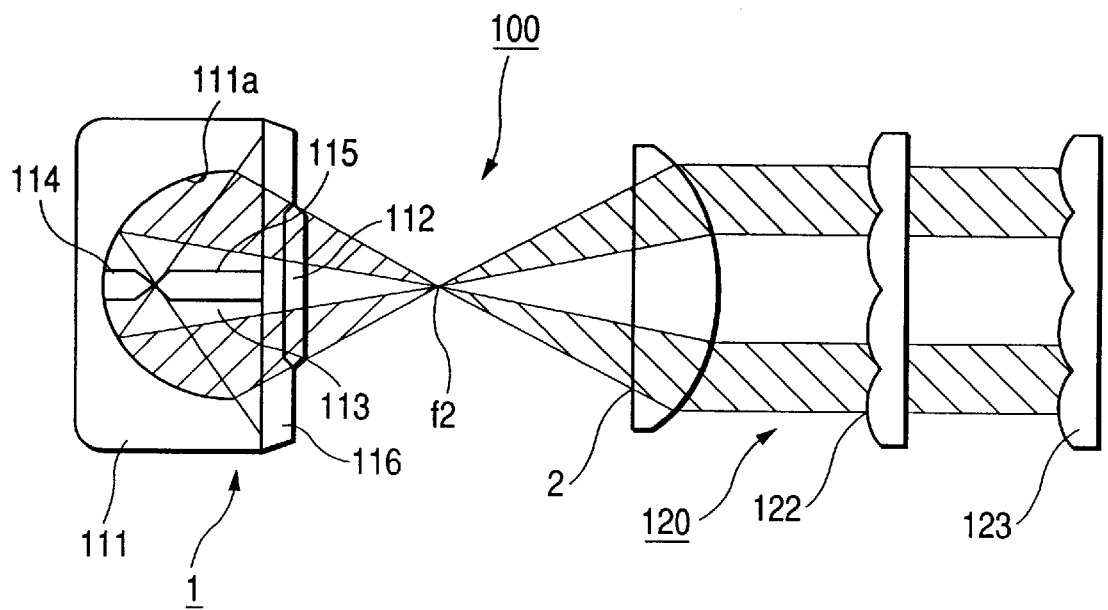
FIG. 12 is a schematic view showing an illumination apparatus in accordance with an embodiment of the present invention.

FIG. 12 is a schematic view showing an illumination apparatus in accordance with a preferable embodiment of the present invention. The illumination apparatus 100 comprises a convergence-type, reflector equipped xenon lamp (i.e., light source) 1 and an illuminating device 120 that unifies an illuminance distribution.

As shown in FIG. 12, the reflector equipped xenon lamp 1 comprises a ceramic reflector 111 with an elliptic reflection mirror 111a. A metallic conductor 116 with a transparent glass plate 112 closes the elliptic reflection mirror 111a. A closed space enclosed by the reflector 111 and the metallic conductor 116 is filled with Xenon gas 113. A metallic anode 114, serving as part of a light-emitting portion, protrudes from a center of the elliptic reflection mirror 111a into the reflector 111. A metallic cathode 115, also serving as part of the light-emitting portion, protrudes into the reflector 111 from a portion corresponding to the center of the transparent glass plate 112 so as to oppose to the metallic anode 114 with a predetermined gap (e.g., approximately 1 mm). The metallic cathode 115 is connected to the metallic conductor 116. When current flows from the anode 114 to the cathode 115, the xenon gas 113 emits light due to excitation of these electrodes 114 and 115. As a result, white light is produced from the light-emitting portion located at a first focal point (i.e., located between the electrodes 114 and 115). The emitted white light is once converged to the second focal point (f2) of the elliptic reflection mirror 111a. Subsequently, the white light enters a collimator lens 2 that converts the received white light into parallel beams. The parallel beams illuminate a first fly-eye lens 122 (corresponding to the first integrator 3).

As shown in FIG. 12, the illuminating device 120 comprises the collimator lens 2 and a pair of fly-eye lenses 122 and 123 (corresponding to the integrators 3 and 4). The collimator lens 2 has a spherical aberration not smaller than 0.01f for converting the white light emitted from the reflector equipped xenon lump 1 into the parallel beams. Each of the fly-eye lenses 122 and 123 comprises a plurality of small lenses arranged in a predetermined pattern, and has a function of unifying an illuminance distribution.

Figure 13A:
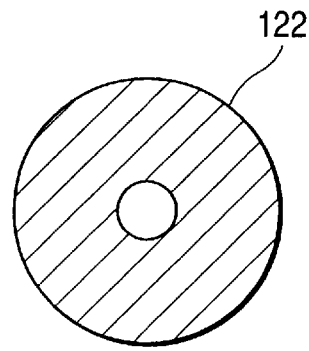
FIG. 13A shows an illuminance distribution on a first fly-eye lens obtained when a collimator lens has a smaller spherical aberration.
Figure 13B:
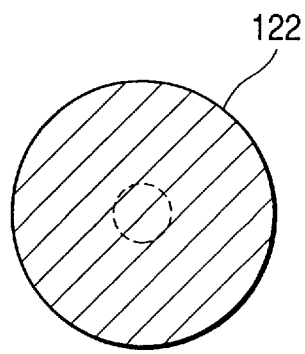
FIG. 13B shows an illuminance distribution on the first fly-eye lens obtained when the collimator lens has a spherical aberration not smaller than 0.01F.
Figure 14:
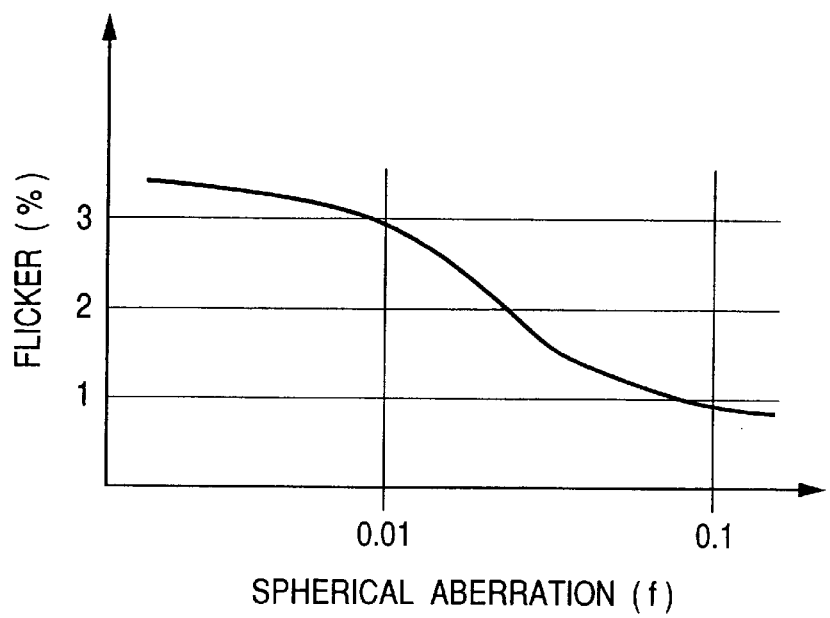
FIG. 14 is a graph showing a relationship between the spherical aberration of the collimator lens and the flicker.

In FIGS. 12, 13A and 13B, the shaded portion indicates a bright portion. FIG. 13A shows an illuminance distribution on the first fly-eye lens 122 obtained when the collimator lens 2 has a smaller spherical aberration. FIG. 13B shows an illuminance distribution on the first fly-eye lens 122 obtained when the collimator lens 2 has a spherical aberration not smaller than 0,01f. FIG. 14 is a graph showing a relationship between the spherical aberration of the collimator lens 2 and the flicker.

According to the above-described illumination apparatus, the collimator lens 2 constitutes part of the illuminating device 120. In view of the convergence characteristics of the illuminating device 120, it is preferable to reduce the spherical aberration. However, when the spherical aberration of the collimator lens 2 is reduced, a central portion of the first fly-eye lens 122 becomes dark and its peripheral ring region becomes bright as shown in the illuminance distribution of FIG. 13A. That is, the center of the optical axis becomes a dark illumination beam. The illumination light fluctuates largely due to the convection. Accordingly, it is preferable to increase the spherical aberration of the collimator lens 2 (to the level exceeding 0.01 f) without deteriorating the convergence characteristics of the illuminating device 120. When the spherical aberration of the collimator lens 2 is increased, the central portion of the first fly-eye lens 122 becomes bright as shown in the illuminance distribution of FIG. 13B. This reduces the fluctuation of the illumination light caused by the convection. Accordingly, an overall illuminance of the illumination apparatus 100 can be improved. Furthermore, the fluctuation of the illumination light of the illumination apparatus 100 caused by the convection can be suppressed to a negligible level when observed on the screen.

Furthermore, as shown in FIG. 14, the flicker can be reduced when the spherical aberration of the collimator lens 2 of the illuminating device 120 is set to a level exceeding 0.01f. Moreover, the gap between the anode 114 and the cathode 115 of the reflector equipped xenon lamp 1 can be reduced to a level of approximately 1 mm. This is effective to downsize the convergence spot. A highly efficient illumination can be realized.

Figure 15:
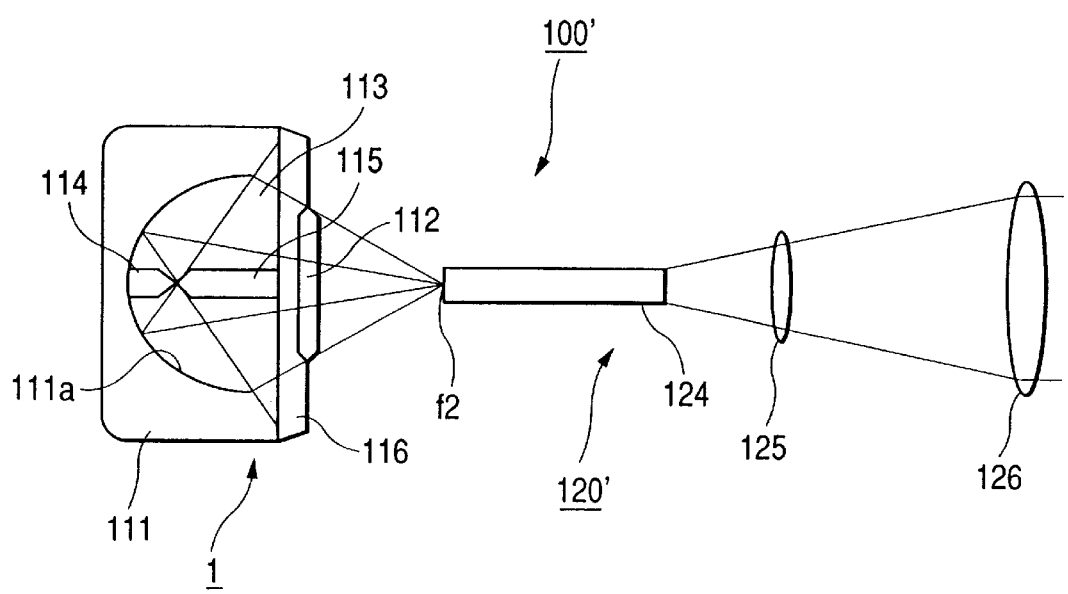
FIG. 15 is a schematic view showing an illumination apparatus in accordance with another embodiment of the present invention.

FIG. 15 is a schematic view showing an illumination apparatus in accordance with another embodiment of the present invention. The illumination apparatus 100' comprises a convergence-type, reflector equipped xenon lamp 1' and an illuminating device 120' that unifies an illuminance distribution. As the reflector equipped xenon lamp 1 is identical with that shown in FIG. 12, the same components are denoted by the identical reference numerals and not explained hereinafter.

Figure 16:
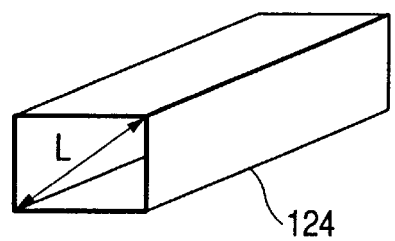
FIG. 16 is a perspective view showing a light pipe employed in the illumination apparatus shown in FIG. 15.

As shown in FIGS. 15 and 16, the illuminating device 120' comprises a light pipe 124 and a pair of convex lenses 125 and 126. The light pipe 124 has a rectangular hollow space defined by an aspect ratio of 3:4 and a diagonal aperture length L in a range of 5 to 10 mm. A front end of the light pipe 124, closer to the reflector equipped xenon lamp 1, is located in the vicinity of the second focal point f2 of the reflector equipped xenon lamp 1.

According to the arrangement of the illumination apparatus 100', the illuminating device 120' comprises the light pipe 124 having a rectangular hollow space defined by an aspect ratio of 3:4 and a diagonal aperture length L in a range of 5 to 10 mm. The inlet aperture of this light pipe 124 is positioned in the vicinity of the second focal point f2 of the reflector equipped xenon lamp 1. This arrangement effectively converges the white light of the reflector equipped xenon lamp 1 into the light pipe 124 and realizes a highly efficient illumination, with convergence characteristics not realized by the conventional metal halide lamp. With this arrangement, the fluctuation of the illumination light of the illumination apparatus 100' caused by the convection can be suppressed to a negligible level when observed on the screen.

Figure 17:
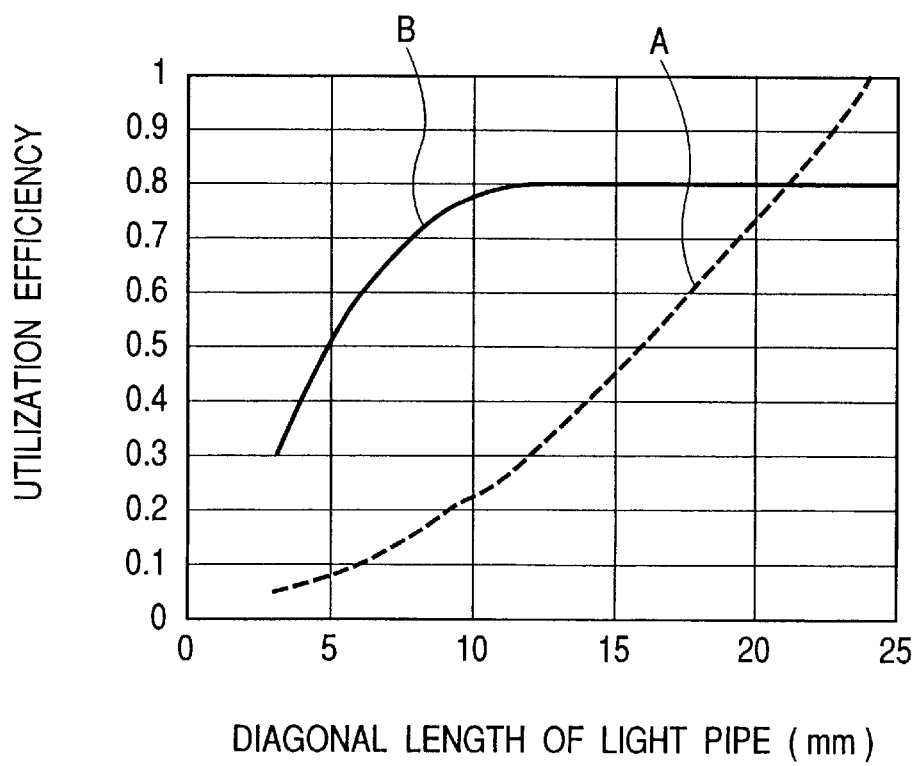
FIG. 17 is a graph showing a relationship between a diagonal aperture length of the light pipe and a utilization efficiency depending on the difference of the convergence characteristics in the illumination apparatus shown in FIG. 15.

In FIG. 17, a curve "A" represents the utilization efficiency of a 300 W metal halide lamp and a curve "B" represents the utilization efficiency of a 300 W reflector equipped xenon lamp. As apparent from FIG. 17, the utilization efficiencies are differentiated by the convergence characteristics. For example, when the reflector equipped xenon lamp has a 6 mm light pipe with the diagonal aperture length L in a range of 5~10 mm, its utilization efficiency is approximately six times the utilization efficiency of the metal halide lamp. Furthermore, even when the utilization efficiency is multiplied with the light emitting efficiency, the brightness of the reflector equipped xenon lamp is two to three times the brightness of the metal halide lamp.

As explained in the foregoing description, according to the present invention, the illuminating device comprises a collimator lens and a pair of fly-eye lenses, and the collimator lens has a spherical aberration not smaller than 0.01 f. This arrangement makes it possible to suppress the fluctuation of the illumination light caused by the convection of the xenon gas, reduce the flicker and improve the illuminance.

Furthermore, according to the present invention, the illuminating device comprises a light pipe having a rectangular hollow space defined by an aspect ratio of 3:4 and a diagonal aperture length of 5 to 10 mm, and the light pipe is located at a second focal point of the xenon lamp. This arrangement makes it possible to suppress the fluctuation of the illumination light caused by the convection of the xenon gas, reduce the flicker and improve the illuminance.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A projection-type display apparatus comprising:
   a light source for emitting white color light;
   a color separating/light guiding optics for separating said white color light emitted from said light source into three primary color beams and for guiding the separated primary color beams to a light modulating/color compositing/image projecting optics located at a deck different from that of said color separating/light guiding optics;
   said light modulating/color compositing/image projecting optics comprises:
      a cross-type dichroic prism with two reflection films crossing each other and having wavelength selectivity for selecting two of three primary colors;
      a projection lens disposed at an outgoing surface of said cross-type dichroic prism;
      polarized beam splitters having outgoing surfaces respectively facing to three incident surfaces of said cross-type dichroic prism and incident surfaces for receiving corresponding primary color beams incoming from said color separating/light guiding optics, said polarized beam splitters having polarizing films directed in predetermined directions in such a manner that said incident surfaces of said polarized beam splitters face toward said color separating/light guiding optics; and
      reflection-type spatial light modulating sections respectively facing to other surfaces opposing to said outgoing surfaces of said polarized beam splitters;
   wherein said color separating/light guiding optics comprises two independent dichroic mirrors which are spatially separated and a plurality of reflection mirrors; and
   a plane region occupied by said color separating/light guiding optics is entirely involved in a plane region occupied by said light modulating/color compositing/image projecting optics when seen in an up-and-down direction.

2. A projection-type display apparatus comprising a light modulating/color compositing/image projecting optics located at a predetermined deck and a color separating/light guiding optics located at another deck, wherein
   said light modulating/color compositing/image projecting optics comprises:
      a cross-type dichroic prism with two reflection films crossing each other and having wavelength selectivity for selecting two of three primary colors;
      a projection lens disposed at an outgoing surface of said cross-type dichroic prism;
      polarized beam splitters having outgoing surfaces respectively facing to three incident surfaces of said cross-type dichroic prism;
      reflection-type spatial light modulating sections respectively facing to other surfaces opposing to said outgoing surfaces of said polarized beam splitters;
   said color separating/light guiding optics separates white color light emitted from a light source into three primary color beams and guides the separated primary color beams to incident surfaces of corresponding polarized beam splitters provided in said light modulating/color compositing/image projecting optics;
   said polarized beam splitters have polarizing films directed in predetermined directions in such a manner that said incident surfaces of said polarized beam splitters face toward said color separating/light guiding optics,
   said color separating/light guiding optics comprises two independent dichroic mirrors and a plurality of reflection mirrors, and
   a plane region occupied by said color separating/light guiding optics is entirely involved in a plane region occupied by said light modulating/color compositing/image projecting optics when seen in an up-and-down direction, wherein
   said color separating/light guiding optics guides first and second primary color beams along first and second optical paths identical in length and extending from said light source to corresponding polarized beam splitters facing to neighboring incident surfaces of said cross-type dichroic prism of said light modulating/color compositing/image projecting optics,
   said color separating/light guiding optics guides a third primary color beam along a third optical path serving as a detoured optical path longer than said first and second optical paths and extending from said light source to the corresponding polarized beam splitter across a dead space below said projection lens of said light modulating/color compositing/image projecting optics, and
   at least one correcting lens is provided in said detoured third optical path to substantially equalize the optical path length of said third primary color beam with those of said first and second primary color beams.

3. The projection-type display apparatus in accordance with claim 1, wherein an intermediate deck of a polarized light selecting optics is interposed between said two decks,
   said polarized light selecting optics comprises three polarized beam splitters facing to corresponding incident surfaces of respective polarized beam splitters of said light modulating/color compositing/image projecting optics, and
   each of said polarized beam splitters of said polarized light selecting optics allows one polarized component of the corresponding primary color beam to pass through and enter the corresponding polarized beam splitter of said light modulating/color compositing/image projecting optics and reflects the other polarized component in a direction different from said one polarized component.

4. The projection-type display apparatus in accordance with claim 2, wherein
   said light source is a xenon lamp equipped with a convergence-type reflector and an illuminating means for unifying an illuminance distribution.

5. The projection-type display apparatus in accordance with claim 4, wherein said illuminating means comprises a collimator lens and a pair of fly-eye lenses, and said collimator lens has a spherical aberration not smaller than 0.01 f.

6. The projection-type display apparatus in accordance with claim 4, wherein said illuminating means comprises a light pipe having a rectangular hollow space defined by an aspect ratio of 3:4 and a diagonal aperture length of 5 to 10 mm, and said light pipe is located in the vicinity of a second focal point of said xenon lamp.

7. A projection-type display apparatus comprising:

a light source for emitting white color light, a color separating/light guiding optics for guiding first and second primary color beams along first and second optical paths identical in length and extending from said light source to corresponding polarized beam splitters facing to neighboring incident surfaces of a cross-type dichroic prism of a light modulating/color compositing/image projecting optics, wherein said light modulating/color compositing/image projecting optics is positioned above said color separating/light guiding optics, said color separating/light guiding optics guides a third primary color beam along a third optical path serving as a detoured optical path longer than said first and second optical paths and extending from said light source to a corresponding polarized beam splitter across a dead space below a projection lens of said light modulating/color compositing/image projecting optics, said projection lens overhanging outward from said cross-type dichroic prism, and at least one correcting lens is provided in said detoured third optical path to substantially equalize the optical path length of said third primary color beam with those of said first and second primary color beams.

8. The projection-type display apparatus in accordance with claim 7, wherein said color separating/light guiding optics comprises a first dichroic mirror and a second dichroic mirror which are separately provided, said first dichroic mirror guides said first and second primary color beams along said first and second optical paths, and said second dichroic mirror guides said third primary color beam along said third optical path.

9. The projection-type display apparatus in accordance with claim 7, wherein a plane region occupied by said color separating/light guiding optics is entirely involved in a plane region occupied by said light modulating/color compositing/image projecting optics when seen in an up-and-down direction.

* * * * *

UNITED STATES PATENT AND TRADEMARK OFFICE
CERTIFICATE OF CORRECTION

PATENT NO. : 6,174,060 B1
DATED : January 16, 2001
INVENTOR(S) : Imaoka et al.

It is certified that error appears in the above-identified patent and that said Letters Patent is hereby corrected as shown below:

Column 1,
The third basic Japanese Application number should be corrected to read:
-- 10-5079 -- not "10-2079"

Signed and Sealed this

First Day of January, 2002

Attest:

JAMES E. ROGAN
*Attesting Officer*    *Director of the United States Patent and Trademark Office*